(12) United States Patent
Liou et al.

(10) Patent No.: US 10,581,161 B2
(45) Date of Patent: Mar. 3, 2020

(54) SMART ANTENNA AND CONTROLLING METHOD THEREOF FOR PASSIVE WI-FI DEVICE

(71) Applicant: ARCADYAN TECHNOLOGY CORPORATION, Hsinchu (TW)

(72) Inventors: Guan-De Liou, Taipei (TW); Shih-Chieh Cheng, Tainan (TW)

(73) Assignee: ARCADYAN TECHNOLOGY CORPORATION, Hsinchu (TW)

( * ) Notice: Subject to any disclaimer, the term of this patent is extended or adjusted under 35 U.S.C. 154(b) by 287 days.

(21) Appl. No.: 15/818,930

(22) Filed: Nov. 21, 2017

(65) Prior Publication Data
US 2019/0103670 A1 Apr. 4, 2019

(30) Foreign Application Priority Data
Sep. 29, 2017 (TW) .............................. 106133776 A (51) Int. Cl.
*H01Q 3/26* (2006.01)
*H04B 7/08* (2006.01)
*H04B 7/06* (2006.01)
*H02J 50/20* (2016.01)

(52) U.S. Cl.
CPC ........... *H01Q 3/2605* (2013.01); *H02J 50/20* (2016.02); *H04B 7/0682* (2013.01); *H04B 7/0695* (2013.01); *H04B 7/084* (2013.01); *H04B 7/088* (2013.01)

(58) Field of Classification Search
CPC ........................... H01Q 3/2605; H01Q 3/2647
See application file for complete search history.

(56) References Cited

U.S. PATENT DOCUMENTS

| | | | |
|---|---|---|---|
| 6,501,943 B1 * | 12/2002 | Ide ....................... | H01Q 3/2605 455/101 |
| 2003/0017852 A1 * | 1/2003 | Miyatani ................ | H01Q 1/246 455/562.1 |
| 2003/0222818 A1 | 12/2003 | Regnier et al. | |
| 2004/0135723 A1 * | 7/2004 | Nakaya ................ | H04B 7/0848 342/372 |
| 2014/0248058 A1 * | 9/2014 | Simpson .............. | H04B 10/112 398/104 |
| 2018/0375703 A1 * | 12/2018 | Kellogg .................. | G01S 13/82 |

FOREIGN PATENT DOCUMENTS

WO  2017027847 A1  2/2017

* cited by examiner

*Primary Examiner* — Peter M Bythrow
(74) *Attorney, Agent, or Firm* — Locke Lord LLP; Tim Tingkang Xia, Esq.

(57) ABSTRACT

A smart antenna is provided, which may include a plurality of antenna units and a controller. The controller may be coupled to the antenna units. The controller may scan an angle range by a first angle interval according to a characteristic vector of the antenna units and an initial angle; if the power change between any two adjacent scanning points is negative, the controller may multiply the first angle interval by a number to generate a second angle interval, and keep scanning the angle range by the second angle interval; when the controller completely scans the angle range or the power change between any two adjacent scanning points is positive, the controller may generate a power spectrum.

20 Claims, 6 Drawing Sheets

SMART ANTENNA AND CONTROLLING METHOD THEREOF FOR PASSIVE WI-FI DEVICE

CROSS REFERENCE TO RELATED APPLICATION

All related applications are incorporated by reference. The present application is based on, and claims priority from, Taiwan Application Serial Number 106133776, filed on Sep. 29, 2017, the disclosure of which is hereby incorporated by reference herein in its entirety.

TECHNICAL FIELD

The technical field relates to a smart antenna, in particular to a high-efficiency smart antenna.

BACKGROUND

In general, Wi-Fi systems are considered energy-consuming, so have yet to be widely applied to sensor network and IoT. Fortunately, passive Wi-Fi devices were developed in 2016 to improve the power consumption of the conventional Wi-Fi systems.

Figure 1:
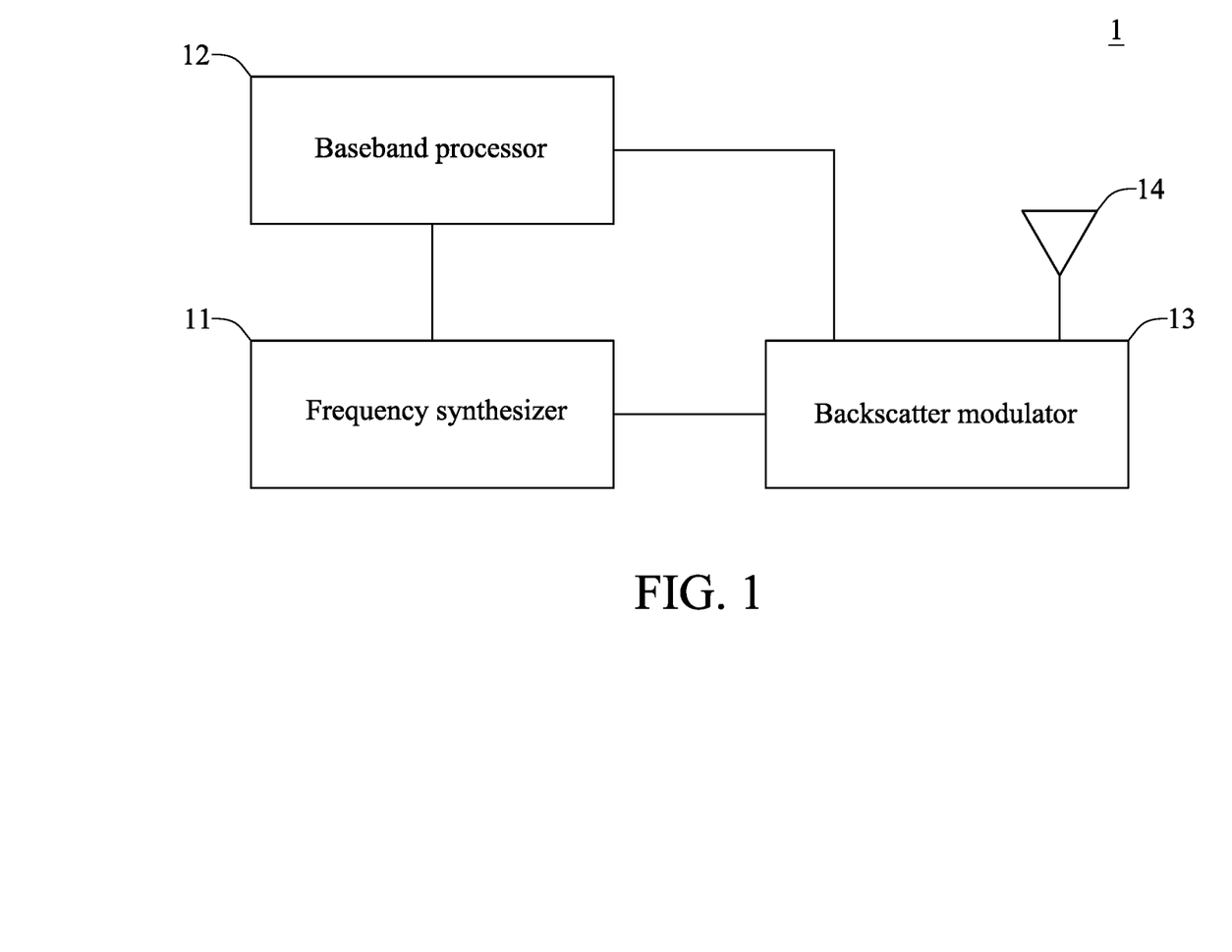
FIG. 1 is a block diagram of a currently available passive Wi-Fi device.

FIG. 1 shows a currently available passive Wi-Fi device 1, which includes a frequency synthesizer 11, a baseband processor 12, a backscatter modulator 13 and an antenna 14.

The frequency synthesizer 11 and the baseband processor 12 are connected to the baseband process or 12 and the backscatter modulator 13.

The baseband processor 12 is connected to the backscatter modulator 13.

The backscatter modulator 13 can transmit data to the antenna 14; when the antenna 14 receives the signals from another electronic device, the antenna 14 can be powered by absorbing the energy of the received signals, and simultaneously transmit the data to the electronic device. Thus, radio waves can simultaneously carry data and electricity via the backscatter communication, so the passive Wi-Fi device 1 can mutually communicate with other electronic devices without power supply.

The passive Wi-Fi device 1 can transmit the wireless signal based on 802.11b, and can directly communicate with various mobile devices, such as smart phones tablet computers, etc.; besides, the passive Wi-Fi device 1 can significantly reduce the power consumption, so can effectively import the drawback of conventional Wi-Fi devices.

However, the passive Wi-Fi device 1 cannot concentrate its beam pattern on a specific direction, so cannot effectively receive signals transmitted from another electronic device, or transmit signals to another electronic device; accordingly, the radio coverage of the passive Wi-Fi device 1 can never be effectively increased. Further, data transmitted by the passive Wi-Fi device 1 tend to leak, so the passive Wi-Fi device 1 cannot insure the information security of users.

Therefore, how to provide a passive Wi-Fi device capable of improving the shortcomings of currently available passive Wi-Fi devices has become an important issue.

SUMMARY

A smart antenna is provided, which may include a plurality of antenna units and a controller. The controller may be coupled to the antenna units. The controller may scan an angle range by a first angle interval according to a characteristic vector of the antenna units and an initial angle; if the power change between any two adjacent scanning points is negative, the controller may multiply the first angle interval by a number to generate a second angle interval, and keep scanning the angle range by the second angle interval; when the controller completely scans the angle range or the power change between any two adjacent scanning points is positive, the controller may generate a power spectrum.

In a preferred embodiment, the controller may select two scanning points with highest powers among the power spectrum, and calculates the average value of the angels corresponding to the selected scanning points to generate an estimated angle.

In a preferred embodiment, the smart antenna may further include a plurality of weighting calculators corresponding to the antenna units, wherein the controller may be coupled to the antenna units via the weighting calculators respectively.

In a preferred embodiment, the controller may change the weightings of the antenna units via the weighting calculators according to the estimated angle in order to adjust the beam pattern of the antenna units.

In a preferred embodiment, the first angle interval may include a plurality of angle units; when the number of the antenna units is lower than or equal to 2, the second angle interval may be lower than or equal to 50°; when the number of the antenna units is higher than or equal to 3, the second angle interval may be lower than or equal to 20°.

A controlling method for smart antenna is provided, in particular to a beam tracking method for antenna, which may include the following steps: scanning an angle range by a first angle interval according to the characteristic vector of antenna units and an initial angle; multiplying the first angle interval by a number to generate a second angle interval, and keeping scanning the angle range by the second angle interval if the power change between any two adjacent scanning points is negative; and generating a power spectrum when the angle range is completely scanned or the power change between any two adjacent scanning points is positive.

In a preferred embodiment, the control method for smart antenna may further include the following step: selecting two scanning points with highest powers among the power spectrum, and calculating the average value of the angels corresponding to the selected scanning points to generate an estimated angle.

In a preferred embodiment, the control method for smart antenna may further include the following step: changing weightings of the antenna units via the weighting calculators according to the estimated angle in order to adjust the beam pattern of the antenna units.

A smart antenna for a passive Wi-Fi device is provided; the passive Wi-Fi device includes a backscatter modulator coupled to the smart antenna to input data into the smart antenna; the smart antenna may include a plurality of antenna units and a controller. The controller may be coupled to the antenna units. The controller may scan an angle range by a first angle interval according to a characteristic vector of the antenna units and an initial angle; if the power change between any two adjacent scanning points is negative, the controller may multiply the first angle interval by a number to generate a second angle interval, and keep scanning the angle range by the second angle interval; when the controller completely scans the angle range or the power change between any two adjacent scanning points is positive, the controller may generate a power spectrum.

In a preferred embodiment, the controller may select two scanning points with highest powers among the power spectrum, and calculates the average value of the angels corresponding to the selected scanning points to generate an estimated angle.

In a preferred embodiment, the smart antenna may further include a plurality of weighting calculators corresponding to the antenna units, wherein the controller may be coupled to the antenna units via the weighting calculators respectively.

In a preferred embodiment, the controller may change the weightings of the antenna units via the weighting calculators according to the estimated angle in order to adjust the beam pattern of the antenna units.

In a preferred embodiment, the first angle interval may include a plurality of angle units; when the number of the antenna units is lower than or equal to 2, the second angle interval may be lower than or equal to 50°; when the number of the antenna units is higher than or equal to 3, the second angle interval may be lower than or equal to 20°.

As described above, the smart antenna and the controlling method thereof for passive Wi-Fi device according to the exemplary embodiments of the present disclosure may have the following advantages:

(1) According to one embodiment of the present disclosure, the beam pattern of the smart antenna of the passive Wi-Fi device can be concentrated to a specific direction to track one or more targets, so can more effectively receive signals from or transmit signals to other electronic devices.

(2) According to one embodiment of the present disclosure, the beam pattern of the smart antenna of the passive Wi-Fi device can be concentrated to a specific direction, so the radio coverage of the passive Wi-Fi device can be significantly increased.

(3) According to one embodiment of the present disclosure, the beam pattern of the smart antenna of the passive Wi-Fi device can be concentrated to a specific direction, so the data transmitted by the passive Wi-Fi device does not tend to leak; therefore, the passive Wi-Fi device can ensure the information of users.

(4) According to one embodiment of the present disclosure, the smart antenna of the passive Wi-Fi device has a special beam tracking mechanism, which is high-efficiency and of low power consumption, so can significantly improve the drawbacks of the conventional delay-and-sum method.

(5) According to one embodiment of the present disclosure, the passive Wi-Fi device integrating the smart antenna having the special beam tracking mechanism, so the SNR (Signal-to-Noise Ratio) of the passive Wi-Fi device can be effectively increased.

(6) According to one embodiment of the present disclosure, the passive Wi-Fi device integrating the smart antenna having the special beam tracking mechanism, so can realize context-aware services in communication systems, which is more comprehensive in use.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
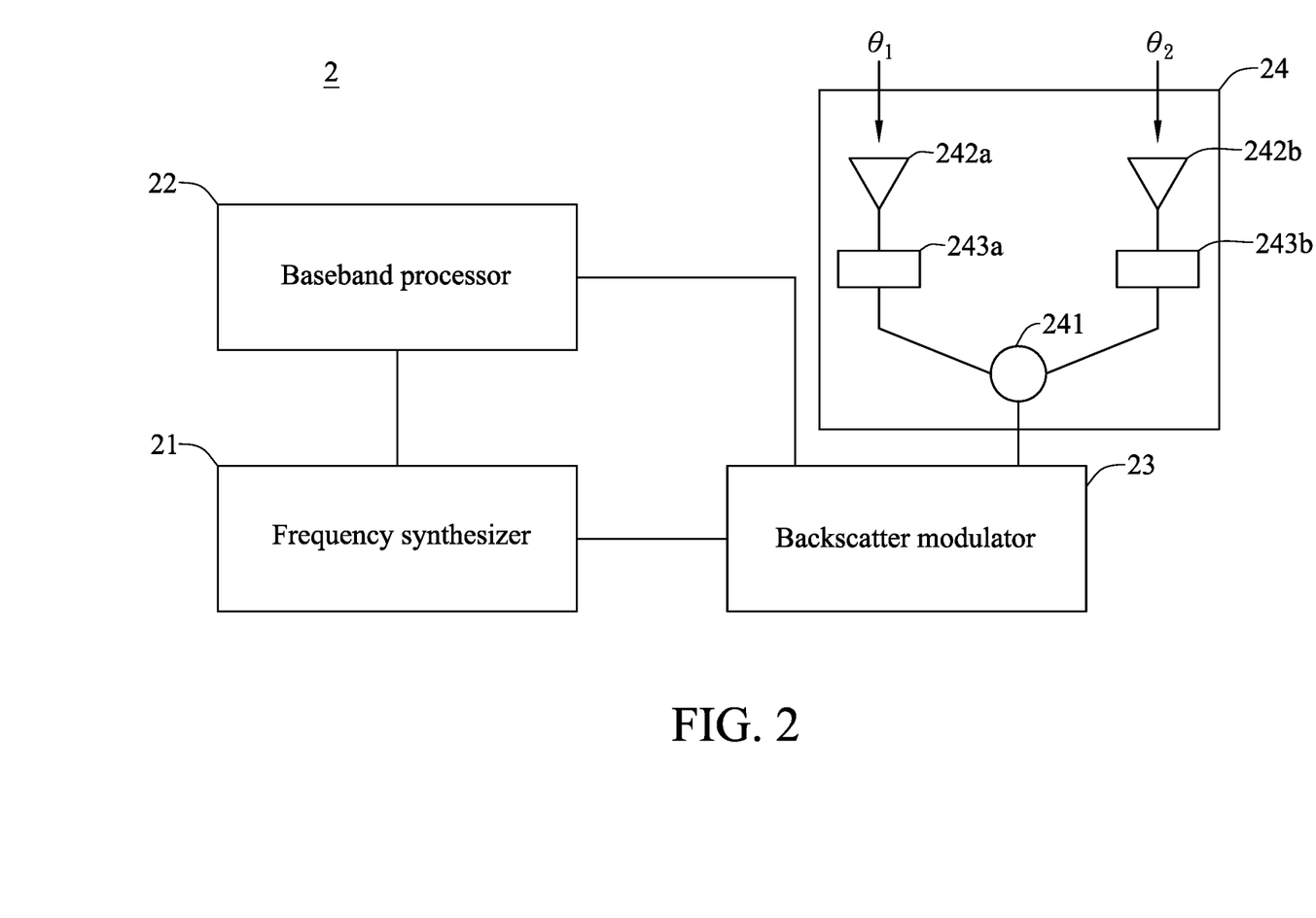
FIG. 2 is a block diagram of a passive Wi-Fi device of a first embodiment in accordance with the present disclosure.

Please refer to FIG. 2, which is a block diagram of a passive Wi-Fi device of a first embodiment in accordance with the present disclosure. As shown in FIG. 2, the passive Wi-Fi device 2 may include a frequency synthesizer 21, a baseband processor 22, a backscatter modulator 23 and a smart antenna 24.

The frequency synthesizer 21 and the baseband processor 22 may be coupled to the baseband process or 22 and the backscatter modulator 23.

The baseband processor 22 may be coupled to the backscatter modulator 23.

The backscatter modulator 23 may be coupled to the smart antenna 24.

The backscatter modulator 23 may transmit data to the smart antenna 24; when the smart antenna 24 receives signals from another electronic device, the antenna 14 can be powered by absorbing the energy of the received signals, and simultaneously transmit the data to the electronic device.

The smart antenna 24 may include a controller 241, a plurality of antenna units 242a and 242b, and a plurality of weighting calculators 243a and 243b.

The antenna unit 242a may generate an input value $\theta_1$ according to the input signal transmitted from an electronic device.

The antenna unit 242b may generate an input value $\theta_2$ according to the input signal transmitted from the electronic device; in the embodiment, the number of the antenna unit may be 2; in another embodiment, the number of the antenna units may be more than 2.

The weighting calculator 243a and 243b may be corresponding to the antenna units 242a and 242b respectively.

The controller 241 may be coupled to the antenna units 242a and 242b via the weighting calculators 243a and 243b respectively.

The controller 241 may obtain a characteristic vector according to the input values $\theta_1$ and $\theta_2$ of the antenna units 242a and 242b, and may scan an angle range by a first angle interval N; if the power change between any two adjacent scanning points is negative, the controller 241 may multiply the first angle interval N by a number M to generate a second angle interval K, as shown in Equation (1):

$$N \times M = K \quad (1)$$

In Equation (1), N stands for the first angle interval, which includes a plurality of angle units; in the embodiment, one angle unit is 1°; M stands for the number; K stands for the second angle interval.

In the embodiment, as the number of the antenna units 242a and 242b is lower or equal to 2, the second angle interval K should be lower or equal to 50°, as shown in Equation (2):

$$K \leq 50° \quad (2)$$

Then, the controller 241 can keep scan the angle range by the second angle interval K; when the controller 241 completely scans the angle range or the power change between any two adjacent scanning points is positive, the controller 241 can generate a power spectrum; then, the controller 241 may select two scanning points with highest powers among the power spectrum, and calculate the average value of the angles corresponding to the selected scanning points to generate an estimated angle; finally, the controller 241 can change the weightings of the antenna units 242a and 242b via the weighting calculators 243a and 243b to adjust the beam pattern of the antenna units 242a and 242b; in this way, the smart antenna 24 can more effectively receive the input signals transmitted from the electronic device.

Figure 3:
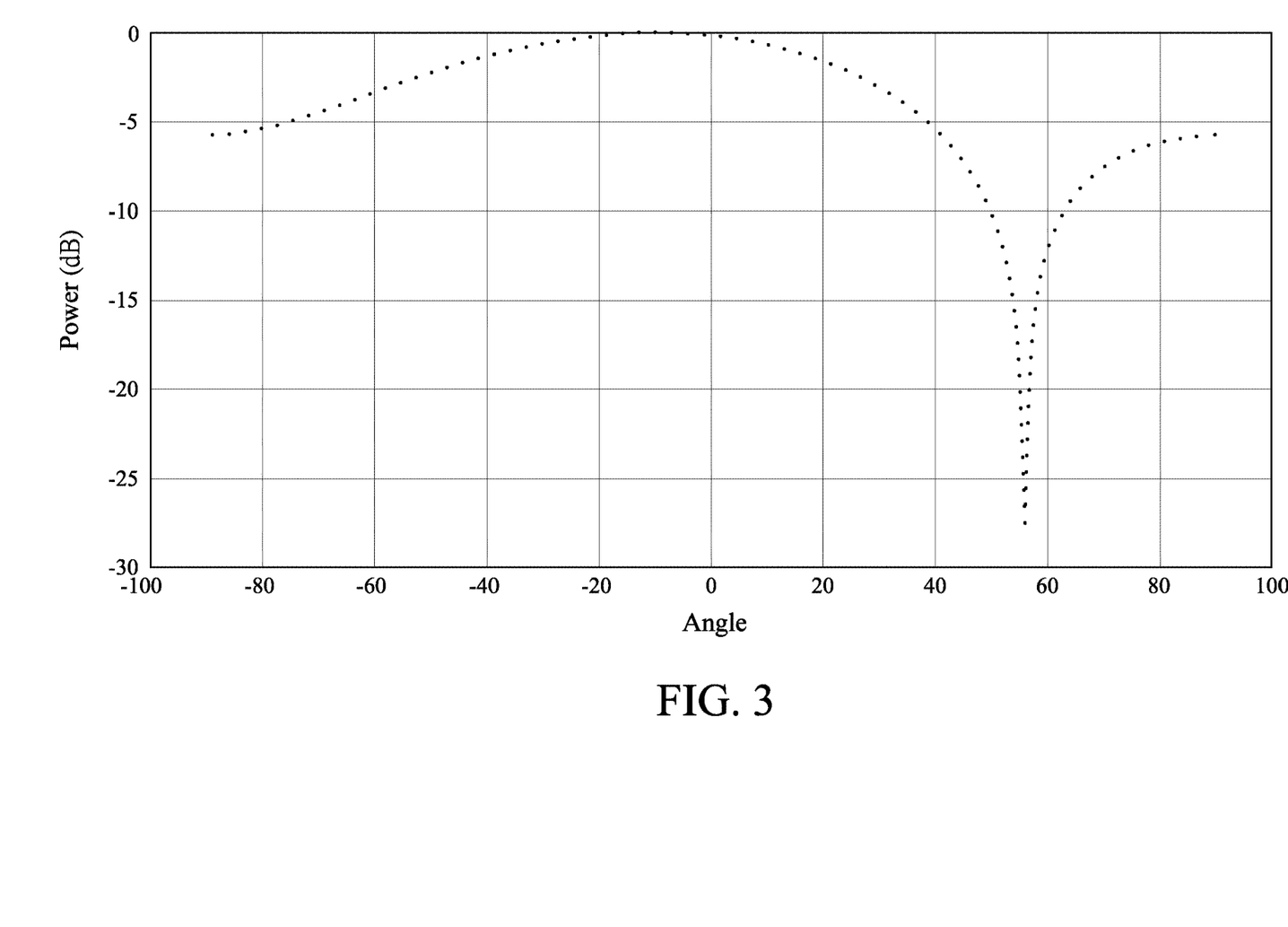
FIG. 3 is a power spectrum of conventional delay-and-sum method.

Please refer to FIG. 3, which is a power spectrum of conventional delay-and-sum method. As shown in FIG. 3, if an angle range)(−100°~100° is scanned by conventional delay-and-sum method, it is necessary to scan each of the angle units (1°) of the angle range in order to obtain a power spectrum; then, the peak value of the power spectrum can be selected to serve as an estimated angle to adjust the beam pattern of the antenna according to the angle corresponding to the peak value; therefore, conventional delay-and-sum method is low-efficiency and of high power consumption.

Figure 4:
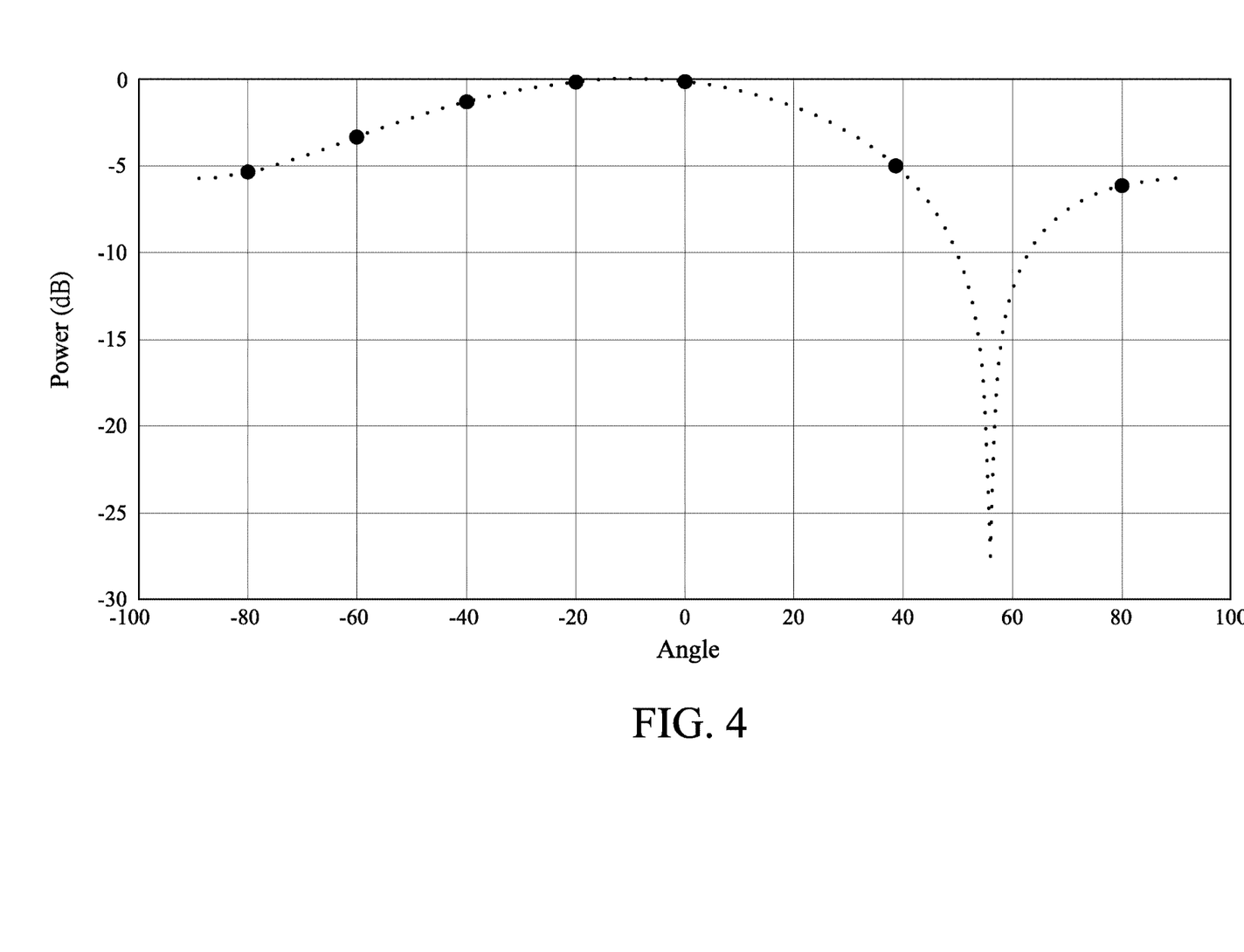
FIG. 4 is a power spectrum of the passive Wi-Fi device of the first embodiment in accordance with the present disclosure.

Please refer to FIG. 4, which is a power spectrum of the passive Wi-Fi device of the first embodiment in accordance with the present disclosure. As shown in FIG. 4, the smart antenna 24 of the passive Wi-Fi device 2 can effectively improve conventional delay-and-sum method; the smart antenna 24 can the first angle interval N including 20 angle units to scan the angle range, and can generate the power spectrum via the above mechanism in order to swiftly generate the estimated angle to adjust the beam pattern of the smart antenna 24; by means of the above mechanism, the smart antenna 24 can significantly reduce the scanning time without reducing the accuracy, and can simultaneously decrease the power consumption; therefore, the passive Wi-Fi device 2 can definitely improve the drawbacks of conventional delay-and-sum method.

As described above, the passive Wi-Fi device may include the smart antenna, so the beam pattern thereof can concentrate on a specific direction to track one or more targets, so can more effectively receive signals from other electronic devices or transmit signals to other electronic devices; in addition, the radio coverage of the passive Wi-Fi device can also be significantly increased.

Moreover, the smart antenna of the passive Wi-Fi device of the embodiment has a special beam tracking mechanism, so can be high-efficiency and of lower power consumption, which can effectively improve the drawbacks of conventional delay-and-sum method.

Figure 5:
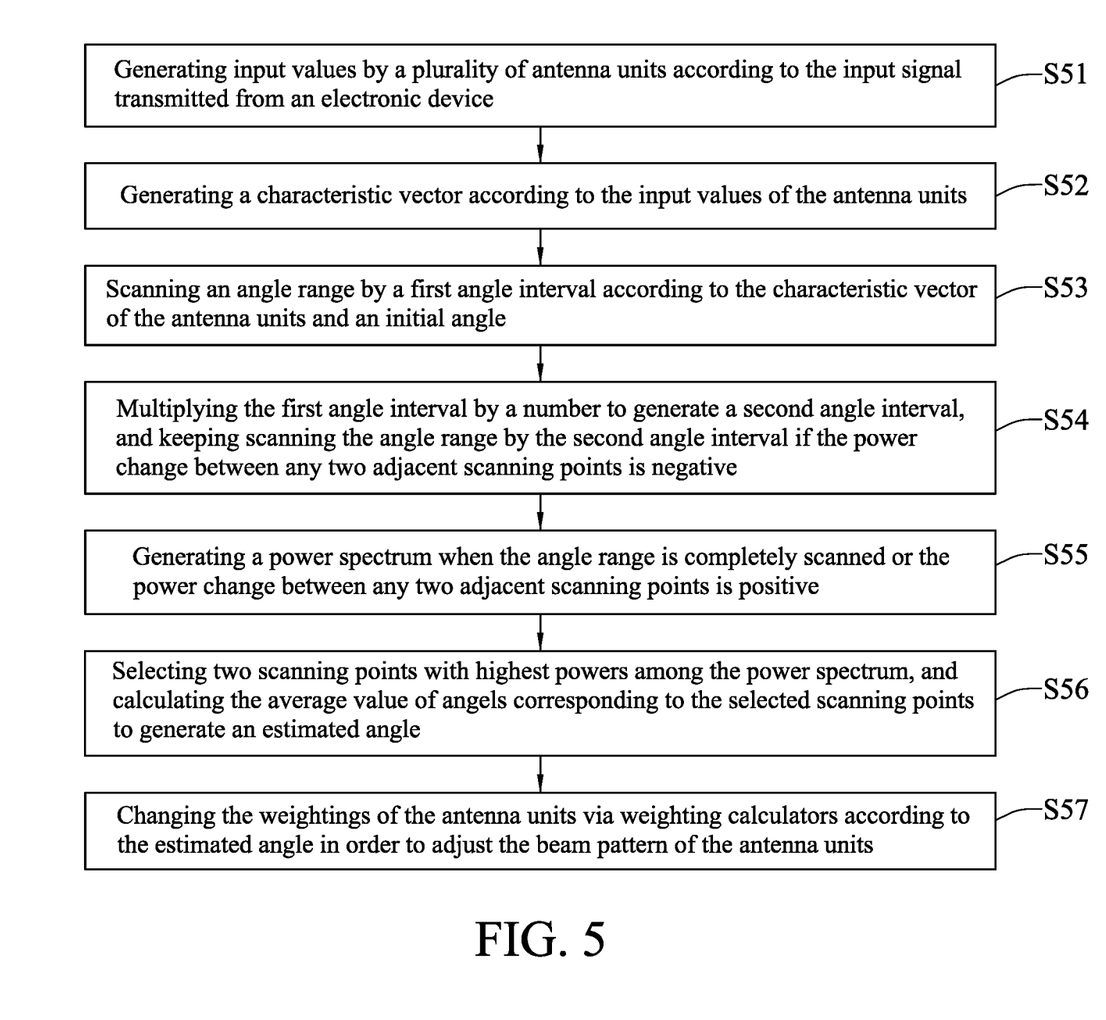
FIG. 5 is a flow chart of the first embodiment.

Please refer to FIG. 5, which is a flow chart of the first embodiment in accordance with the present disclosure. As shown in FIG. 5, the controlling method of the passive Wi-Fi device of the embodiment may include the following steps:

Step S51: generating input values by a plurality of antenna units according to the input signal transmitted from an electronic device.

Step S52: generating a characteristic vector according to the input values of the antenna units.

Step S53: scanning an angle range by a first angle interval according to the characteristic vector of the antenna units and an initial angle.

Step S54: multiplying the first angle interval by a number to generate a second angle interval, and keeping scanning the angle range by the second angle interval if the power change between any two adjacent scanning points is negative.

Step S55: generating a power spectrum when the angle range is completely scanned or the power change between any two adjacent scanning points is positive.

Step S56: selecting two scanning points with highest powers among the power spectrum, and calculating the average value of angels corresponding to the selected scanning points to generate an estimated angle.

Step S57: changing the weightings of the antenna units via weighting calculators according to the estimated angle in order to adjust the beam pattern of the antenna units.

The embodiment just exemplifies the present disclosure and is not intended to limit the scope of the present disclosure; any equivalent modification and variation according to the spirit of the present disclosure is to be also included within the scope of the following claims and their equivalents.

It is worthy to point out that conventional Wi-Fi devices cannot concentrate the beam pattern on a specific direction, so cannot effectively receive signals transmitted from another electronic device, or transmit signals to another electronic device. Thus, the radio coverage of conventional passive Wi-Fi devices can never be effectively increased. Besides, data transmitted by conventional passive Wi-Fi devices tend to leak, so conventional passive Wi-Fi devices cannot ensure the information security of users. On the contrary, according to one embodiment of the present disclosure, the beam pattern of the smart antenna of the passive Wi-Fi device can be concentrated to a specific direction to track one or more targets, so can more effectively receive signals from or transmit signals to other electronic devices; also, the smart antenna can significantly increase the radio coverage of the passive Wi-Fi device, and prevent data from leaking; therefore, the information security of users can be ensured.

Further, conventional smart antennas usually adopt delay-and-sum method to track targets; however, delay-and-sum method should scan each of the angle units of an angle range in order to obtain a power spectrum, and then select the peak value of the power spectrum to adjust the beam pattern of the antenna according to the angle corresponding to the selected angle, which is low-efficiency and of high power consumption. On the contrary, according to one embodiment of the present disclosure, the smart antenna of the passive Wi-Fi device has a special beam tracking mechanism, which is high-efficiency and of low power consumption, so can significantly improve the drawbacks of the conventional delay-and-sum method.

Moreover, according to one embodiment of the present disclosure, the passive Wi-Fi device integrated with the smart antenna having the special beam tracking mechanism, so the SNR (Signal-to-Noise Ratio) of the passive Wi-Fi device can be effectively increased.

Furthermore, according to one embodiment of the present disclosure, the passive Wi-Fi device integrating the smart antenna having the special beam tracking mechanism, so can realize context-aware services in communication systems, which is more comprehensive in use.

Figure 6:
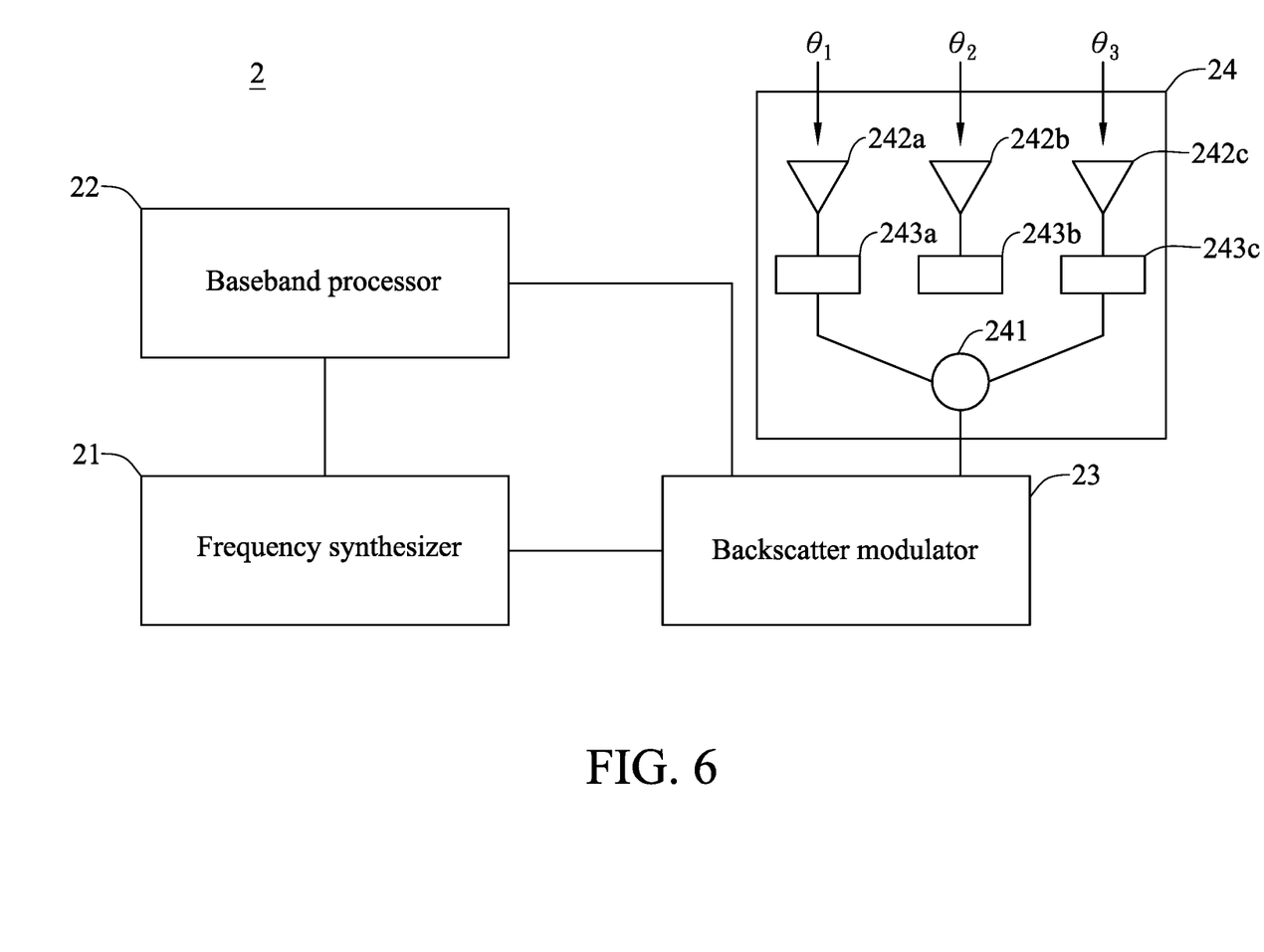
FIG. 6 is a block diagram of a passive Wi-Fi device of a second embodiment in accordance with the present disclosure.

Please refer to FIG. 6, which is a block diagram of a passive Wi-Fi device of a second embodiment in accordance with the present disclosure. As shown in FIG. 6, the passive Wi-Fi device 2 may include a frequency synthesizer 21, a baseband processor 22, a backscatter modulator 23 and a smart antenna 24.

The frequency synthesizer 21 and the baseband processor 22 may be coupled to the baseband process or 22 and the backscatter modulator 23.

The baseband processor 22 may be coupled to the backscatter modulator 23.

The backscatter modulator 23 may be coupled to the smart antenna 24.

The backscatter modulator 23 may transmit data to the smart antenna 24; when the smart antenna 24 receives signals from another electronic device, the antenna 14 can be powered by absorbing the energy of the received signals, and simultaneously transmit the data to the electronic device.

The difference between the embodiment and the previous embodiment is that the smart antenna 24 may include a controller 241, a plurality of antenna units 242a, 242b and 242c and a plurality of weighting calculators 243a, 243b and 243c.

The antenna unit 242a may generate an input value $\theta_1$ according to the input signal transmitted from an electronic device; the antenna unit 242b may generate an input value $\theta_2$ according to the input signal transmitted from the electronic device; the antenna unit 242c may generate an input value $\theta_3$ according to the input signal transmitted from the electronic device; in the embodiment, the number of the antenna units is 3.

The weighting calculator 243a, 243b and 243c may be corresponding to the antenna units 242a, 242b and 243c respectively.

The controller 241 may be coupled to the antenna units 242a, 242b and 243c via the weighting calculators 243a, 243b and 243c respectively.

The controller 241 may obtain a characteristic vector according to the input values $\theta_1$, $\theta_2$ and $\theta_3$ of the antenna units 242a, 242b and 243c, and may scan an angle range by a first angle interval N; if the power change between any two adjacent scanning points is negative, the controller 241 may multiply the first angle interval N by a number M to generate a second angle interval K, as shown in aforementioned Equation (1).

In the embodiment, as the number of the antenna units 242a, 242b and 243c is higher than or equal to 3, the second angle interval K should be lower than or equal to 20°, as shown in Equation (3):

$$K \leq 20° \quad (3)$$

Similarly, the controller 241 can keep scan the angle range by the second angle interval K; when the controller 241 completely scans the angle range or the power change between any two adjacent scanning points is positive, the controller 241 can generate a power spectrum; then, the controller 241 may select two scanning points with highest powers among the power spectrum, and calculate the average value of the angles corresponding to the selected scanning points to generate an estimated angle; finally, the controller 241 can change the weightings of the antenna units 242a, 242b and 242c via the weighting calculators 243a, 243b and 243c to adjust the beam pattern of the antenna units 242a, 242b and 243c; in this way, the smart antenna 24 can more effectively receive the input signals transmitted from the electronic device.

As described above, if the smart antenna 24 of the passive Wi-Fi device 2 includes 3 or more antenna units, the passive Wi-Fi device 2 can still use the above controlling method to better the performance of the smart antenna 24 thereof.

The embodiment just exemplifies the present disclosure and is not intended to limit the scope of the present disclosure; any equivalent modification and variation according to the spirit of the present disclosure is to be also included within the scope of the following claims and their equivalents.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A smart antenna, comprising:
   a plurality of antenna units; and
   a controller, coupled to the antenna units;
   wherein the controller scans an angle range by a first angle interval according to a characteristic vector of the antenna units and an initial angle; if a power change between any two adjacent scanning points is negative, the controller multiplies the first angle interval by a number to generate a second angle interval, and keeps scanning the angle range by the second angle interval; when the controller completely scans the angle range or the power change between any two adjacent scanning points is positive, the controller generates a power spectrum.

2. The smart antenna of claim 1, wherein each of the antenna units receives an input value from an electronic device.

3. The smart antenna of claim 2, wherein the controller generates the characteristic value according to the input values of the antenna units.

4. The smart antenna of claim 1, wherein the controller selects two scanning points with highest powers among the power spectrum, and calculates an average value of angels corresponding to the selected scanning points to generate an estimated angle.

5. The smart antenna of claim 4, further comprising a plurality of weighting calculators corresponding to the antenna units, wherein the controller is coupled to the antenna units via the weighting calculators respectively.

6. The smart antenna of claim 5, wherein the controller changes weightings of the antenna units via the weighting calculators according to the estimated angle in order to adjust a beam pattern of the antenna units.

7. The smart antenna of claim 6, wherein the first angle interval comprises a plurality of angle units; when a number of the antenna units is lower than or equal to 2, the second angle interval is lower than or equal to 50°.

8. The smart antenna of claim 7, wherein when the number of the antenna units is higher than or equal to 3, the second angle interval is lower than or equal to 20°.

9. A control method for smart antenna, in particular to a beam tracking method for antenna, comprising the following steps:

scanning an angle range by a first angle interval according to a characteristic vector of antenna units and an initial angle;

multiplying the first angle interval by a number to generate a second angle interval, and keeping scanning the angle range by the second angle interval if a power change between any two adjacent scanning points is negative; and generating a power spectrum when the angle range is completely scanned or the power change between any two adjacent scanning points is positive.

10. The control method for smart antenna of claim 9, further comprising the following step:

generating the characteristic vector according to input values of the antenna units.

11. The control method for smart antenna of claim 10, further comprising the following step:

selecting two scanning points with highest powers among the power spectrum, and calculating an average value of angels corresponding to the selected scanning points to generate an estimated angle.

12. The control method for smart antenna of claim 11, further comprising the following step:

changing weightings of the antenna units via the weighting calculators according to the estimated angle in order to adjust a beam pattern of the antenna units.

13. A smart antenna for a passive Wi-Fi device, the passive Wi-Fi device comprising a backscatter modulator, wherein the backscatter modulator is coupled to the smart antenna, and inputs data into the smart antenna; the smart antenna comprises:

a plurality of antenna units; and
a controller, coupled to the antenna units;

wherein the controller scans an angle range by a first angle interval according to a characteristic vector of the antenna units and an initial angle; if a power change between any two adjacent scanning points is negative, the controller multiplies the first angle interval by a number to generate a second angle interval, and keeps scanning the angle range by the second angle interval;

when the controller completely scans the angle range or the power change between any two adjacent scanning points is positive, the controller generates a power spectrum.

14. The smart antenna of claim 13, wherein each of the antenna units receives an input value from an electronic device.

15. The smart antenna of claim 14, wherein the controller generates the characteristic value according to the input values of the antenna units.

16. The smart antenna of claim 13, wherein the controller selects two scanning points with highest powers among the power spectrum, and calculates an average value of angels corresponding to the selected scanning points to generate an estimated angle.

17. The smart antenna of claim 16, further comprising a plurality of weighting calculators corresponding to the antenna units, wherein the controller is coupled to the antenna units via the weighting calculators respectively.

18. The smart antenna of claim 17, wherein the controller changes weightings of the antenna units via the weighting calculators according to the estimated angle in order to adjust a beam pattern of the antenna units.

19. The smart antenna of claim 18, wherein the first angle interval comprises a plurality of angle units; when a number of the antenna units is lower than or equal to 2, the second angle interval is lower than or equal to 50°.

20. The smart antenna of claim 19, wherein when the number of the antenna units is higher than or equal to 3, the second angle interval is lower than or equal to 20°.

* * * * *